(No Model.)

J. R. BUCHANAN.
UNDERCHECK FOR HORSES.

No. 532,308. Patented Jan. 8, 1895.

Witnesses
F. L. Ourand
Henry Smith

Inventor
James R. Buchanan
by S. C. Fitzgerald
Attorney

UNITED STATES PATENT OFFICE.

JAMES R. BUCHANAN, OF LOWELL, MICHIGAN.

UNDERCHECK FOR HORSES.

SPECIFICATION forming part of Letters Patent No. 532,308, dated January 8, 1895.

Application filed September 29, 1894. Serial No. 524,419. (No model.)

*To all whom it may concern:*

Be it known that I, JAMES R. BUCHANAN, a citizen of the United States, residing at Lowell, in the county of Kent and State of Michigan, have invented certain new and useful Improvements in Underchecks for Horses; and I do hereby declare the following to be a full, clear, and exact description of the invention, such as will enable others skilled in the art to which it appertains to make and use the same.

My invention relates to improvements in harness for horses and especially to underchecking.

The invention will first be described in connection with the accompanying drawings, and then particularly pointed out in the claims.

Figure 1:
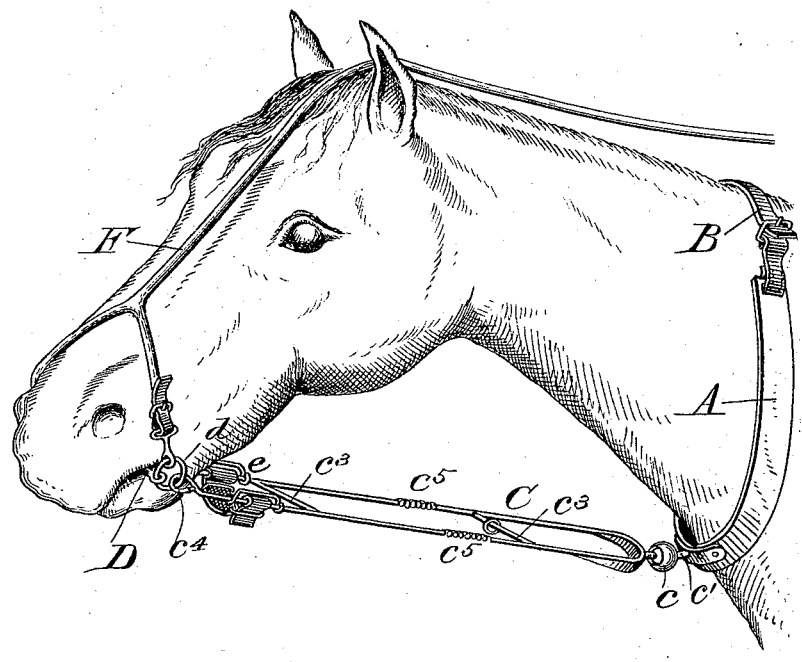
Figure 2:
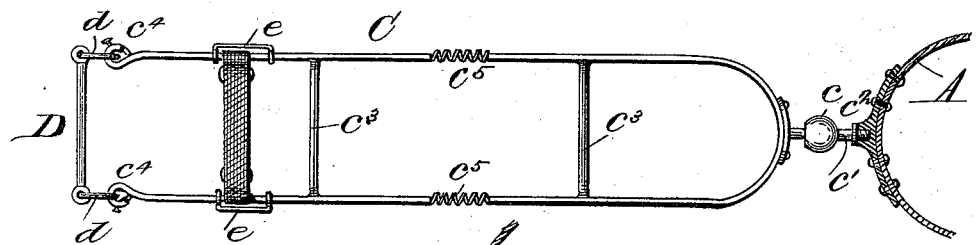
Figure 3:
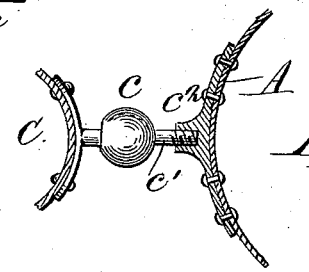

In the drawings—Figure 1 is a perspective view of my invention as it appears when placed on a horse. Fig. 2 is a plan view of the device alone. Fig. 3 is a detail view.

Referring to the drawings, A is a yoke arranged to fit on the under side of the neck of the animal, as shown, being held in place by an over strap B which connects the two ends of the yoke A and passes over the top of the neck of the horse. To the lower central portion of the yoke is pivotally attached a stay-frame C, preferably by ball and socket joint $c$ which may be made separable by threading the front part $c'$ onto the rear part $c^2$, as shown, in detail in Fig. 3.

The stay C, which is preferably of light metal has two cross-braces $c^3$ and is provided with hooks $c^4$ at its front end, for engagement with rings $d$ at each end of a bit D, which in this case is an ordinary bar-bit. To the stay C is also secured a curb strap E which may be held against sliding along the stay by means of loops $e$ of wire each loop having its ends wrapped around the stay, as shown. This curb strap is designed specially for use in case the animal has a tender mouth, in which case the ends of the stays are hooked directly to the over check strap, the curb strap being brought well forward underneath the animal's chin, securing the head in the desired position without the intervention of the bit. The stay C is also preferably provided with helical portions $c^5$ which serve as springs to give elasticity to the stay. To each end of the bit is also attached the usual over-check strap F which is secured at the other end to the terret in the ordinary way.

The manner of applying my device is apparent from the drawings.

It will be seen that when a horse is provided with an undercheck made in accordance with my invention, it is prevented from throwing its head downward and backward, which act tends to compress the wind pipe, and to a certain extent causing the animal to become choked or short winded and thereby disabled. This is especially so in racing animals, and my device is designed to overcome this disadvantage. Furthermore, in animals being broken, it prevents them from "bucking" and keeps the animal on his good behavior while my said device is in use, as will be readily understood by those skilled in the art.

Having thus fully described my invention, what I claim as new, and desire to secure by Letters Patent, is—

1. In an undercheck for horses, the combination, with a bit, and a stay secured to the bit, of a yoke device arranged to fit under the animal's neck, a strap connecting the two ends of the yoke and arranged to pass over the animal's neck, and a ball and socket device connecting the stay to the lower end of the yoke, substantially as described.

2. In an undercheck for horses, the combination, with a bit, of a U-shaped stay having its ends attached to the ends of the bit, and provided with cross braces and spring portions, a yoke device arranged to be secured to the animal's neck and a ball and socket device secured to the stay and to the lower end of the yoke, substantially as described.

3. In an undercheck for horses, the combination, with a U-shaped stay, and a yoke arranged to be secured to the animal's neck, of a ball and socket device connecting the stay to the lower end of the yoke, and a curb strap attached to the stay near its front end, substantially as described.

In testimony whereof I affix my signature in presence of two witnesses.

JAMES R. BUCHANAN.

Witnesses:
MILTON M. PERRY,
JOHN S. HOOKER.